United States Patent [19]
Ledran

[11] Patent Number: 5,660,786
[45] Date of Patent: Aug. 26, 1997

[54] METHOD OF MANUFACTURING FERRITE MAGNETS FOR MOTORS

[75] Inventor: Jean-Paul Ledran, Evreux, France

[73] Assignee: U.S. Philips Corporation, New York, N.Y.

[21] Appl. No.: 495,130

[22] Filed: Jun. 27, 1995

[30] Foreign Application Priority Data

Jun. 29, 1994 [FR] France ................. 94 08013

[51] Int. Cl.⁶ ............................. H02K 1/17
[52] U.S. Cl. ........................... 264/428; 264/429
[58] Field of Search ..................... 264/428, 429

[56] References Cited

U.S. PATENT DOCUMENTS

| | | | |
|---|---|---|---|
| 4,056,770 | 11/1977 | Mohr et al. ........... | 324/205 |
| 4,703,210 | 10/1987 | Abukawa et al. ....... | 310/154 |
| 5,204,569 | 4/1993 | Hino et al. ........... | 310/154 |

FOREIGN PATENT DOCUMENTS 4-261352  9/1992  Japan ................ H02K 23/04

OTHER PUBLICATIONS

Patent Abstracts of Japan, vol. 014, No. 302 (E-0946), Jun. 28, 1990 & JP-A-02 097261, Sony Corp., Apr. 9, 1990.

Patent Abstracts of Japan, vol. 014, No. 496 (E-0996), Oct. 29, 1990 & JP-A-02 206343 (Sogo Kanko Kaihatsu KK) Aug. 16, 1990.

*Primary Examiner*—Donald E. Czaja
*Assistant Examiner*—Sean Vincent
*Attorney, Agent, or Firm*—Edward Blocker

[57] ABSTRACT

A segment is magnetized by arranging it between two dies of a magnetizable material, which are armatures of an electromagnet and which each contact said segment along one of the cylindrical surfaces. In accordance with the invention, use is made of a die which comprises an element of a magnetizable material which leaves the longitudinal end portions of the piece to be magnetized partly uncovered, said die optionally being supplemented with elements of a nonmagnetic material. The segment may be use in small-power motors, for example for use in cars.

7 Claims, 2 Drawing Sheets

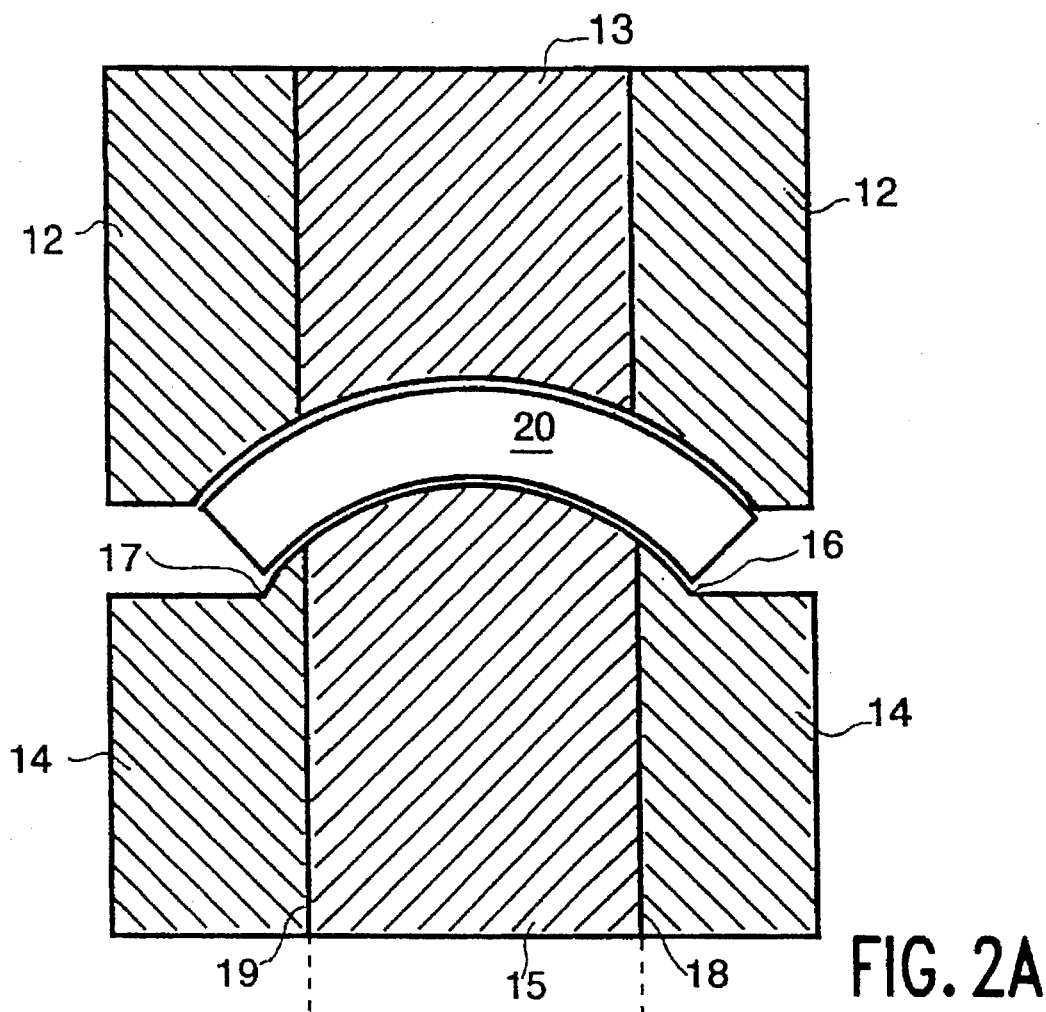
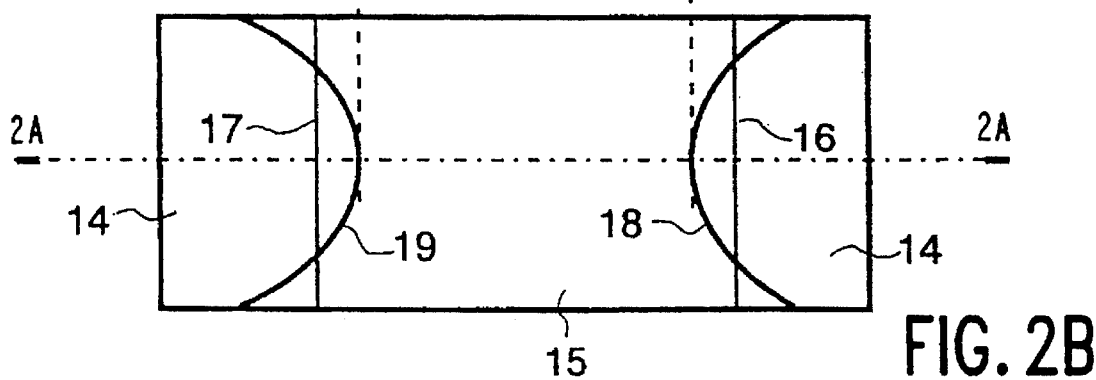
FIG. 2A
FIG. 2B

METHOD OF MANUFACTURING FERRITE MAGNETS FOR MOTORS

BACKGROUND OF THE INVENTION

1. Field of the Invention

The invention relates to a method of manufacturing a ferrite magnet for motors, in which method a piece having the form of a segment of a cylinder is produced by pressing ferrite powder in a mould in the form of a segment of a cylinder, whereafter it is sintered, i.e. heated at a high temperature, and finally magnetized by placing it between two dies of a magnetizable material, which are the armatures of an electromagnet and which each contact said piece along one of the cylindrical surfaces.

The invention also relates to a ferrite magnet in the form of a magnetized segment having magnetic-induction lines which are oriented substantially radially with respect to the cylindrical segment.

2. Description of the Related Art

Such a magnet is used as a pole piece in small-power motors, for example for windscreen wipers, electric windows etc. in cars. At present, it is required that such motors produce very little noise. There is a noise which is caused by a sudden variation of the magnetic field at the ends of the pole pieces. This source of noise is commonly referred to as "cogging torque".

According to JP Kokai No. 4-261352, this effect can be reduced by using a magnet whose end portions have gradually decreasing width dimensions in the direction of the rotary shaft of the motor so as to terminate as a spike. However, such a magnet is expensive to manufacture owing to the complex shape of the mould.

SUMMARY OF THE INVENTION

It is an object of the invention to provide a magnet by means of which the cogging torque can be reduced and which has a standard shape and standard dimensions so that the magnet can be moulded in existing moulds which are used to manufacture ordinary, state-of-the-art magnets and can hence be manufactured interchangeably with said magnets in the manufacture of motors.

This object is achieved, while defining the length of the pieces as being taken along the arc of the circle which forms the cylinder segment, by using at least one die which comprises a portion made of a magnetizable material which leaves the longitudinal end portions of the piece to be magnetized partly uncovered.

Thus, the invention is based on the idea of obtaining a magnetic field which is inhomogeneous, not as regards the shape of the piece but as regards its level of magnetization.

In a particular embodiment, use is made of two dies, each of which comprises a portion made of a magnetizable material which leaves the end portions of the piece to be magnetized partly uncovered. Advantageously, the end faces of said portion made of a magnetizable material are curved or planar, in which latter case they are situated slantwise with respect to the axes of the piece to be magnetized.

In a different embodiment, a die is formed which comprises three portions having parting lines situated at the location of the contact surface between the die and the ferrite piece, only the central part of said die being made from a magnetic material.

By virtue thereof, said die is interchangeable with dies in accordance with prior art, and they can be mounted on the magnetizing machine without any problem. Consequently, use is preferably made of two symmetrical outer portions. In this manner, the cost of the dies can be reduced since the same outer portion is manufactured twice.

Although it is made of a homogeneous ferrite and it has a simple shape, a magnet manufactured as described above comprises at least one end region whose magnetic flux in the ferrite decreases progressively towards the end.

These and other aspects of the invention will be apparent from and elucidated with reference to the embodiments described hereinafter.

BRIEF DESCRIPTION OF THE DRAWINGS

In the drawings:

FIG. 2A is a side view and a sectional view, taken on the line C—C of FIG. 2B, of an assembly of dies for magnetizing a piece.

FIG. 2B is a top view of the lower die of FIG. 2A.

DESCRIPTION OF THE PREFERRED EMBODIMENTS

The various processing steps involved in the manufacture of ferrite magnets from barium/strontium are given as a reminder:

- weighing in and mixing the raw materials, that is the magnetic constituents and a small quantity of a fluxing agent, referred to as "second phase", whose composition is similar to that of a glass and which provides the mixture with thermoplastic properties,
- granulating, that is the formation of small granules to avoid agglomeration at a later stage in the pre-sintering furnace,
- pre-sintering, that is heating to approximately 1300° C. to bring about chemical reactions leading to the formation of ferrite,
- grinding in an aqueous phase to form particles of approximately 0.8 μm,
- decanting,
- pressing the particles in a mould and under a magnetic field to constitute the pieces, thereby removing most of the water (remaining water content approximately 13%) and providing the ferrite crystals with the desired orientation,
- demagnetizing to preclude deformation or agglutination of the pieces under the influence of the field, and removing from the mould
- drying at a low temperature,
- sintering at approximately 1250° C. in a tunnel furnace so as to obtain the correct density, hardness and magnetic properties,
- grinding to obtain the exact dimensions.
- finally, magnetizing between two dies which are the armatures of an electromagnet and which define between each other a space suitable for accommodating a piece.

Figure 1:
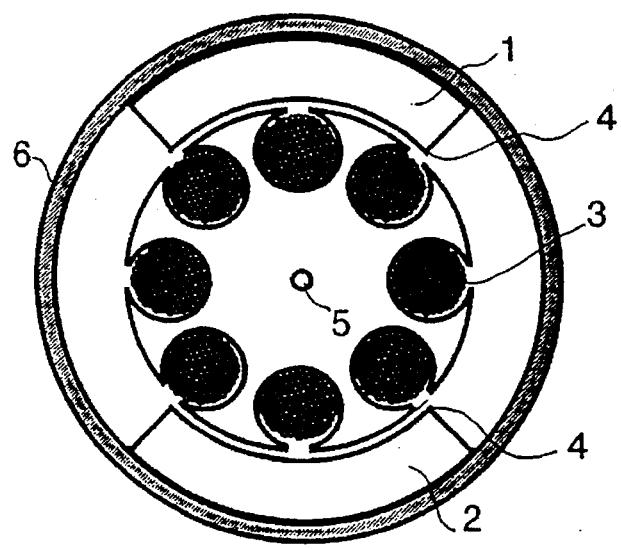
FIG. 1 is a sectional view of a motor comprising permanent magnets.

FIG. 1 is a sectional view of a motor comprising two ferrite magnets 1 and 2 which are each in the form of a cylinder segment. They are secured, for example by means of an adhesive, to a cylindrical housing 6. They are magnetized in accordance with induction lines which extend radially with respect to a circle 6, and they comprise an outer surface, which is remote from the centre of the motor, and an inner surface, which are both a section of a cylinder of revolution. A mild steel cylindrical rotor is arranged between the two magnets, which rotor can rotate around a shaft 5 and whose cylindrical outer surface passes the magnets 1 and 2 as closely as possible. This rotor comprises slots 3 in which the electric wires of a winding are inserted. When a slot moves past an end 4 of a magnet, the magnetic field is interrupted, which brings about a sudden variation in torque, which causes a vibration noise. To avoid this, in the manufacture of the pieces which are to be made into magnets, said pieces are magnetized by means of an electromagnet whose armatures comprise particular dies, as shown in FIG. 2. Of course, these dies are armature elements of a known electromagnet (not shown).

FIG. 2A shows a piece 20 to be magnetized which is arranged between an upper die and a lower die. The upper die comprises three portions, a mild steel central portion 13 and two copper outer portions 12 on either side thereof. The lower die also comprises three portions, a mild steel central portion 15 and two copper outer portions 14 on either side thereof. The portions 13 and 15, which are made from a magnetizable material, leave the longitudinal end portions of the piece 20 to be magnetized partly uncovered, so that upon magnetizing the piece 20, the magnetic induction is concentrated in the iron of the portions 13 and 15, while the end portions of the piece 20, which are situated in front of the non-magnetic elements acquire a weak induction and hence are only weakly magnetized.

FIG. 2B is a top view of the lower die. The parting line 18, which is situated at the boundary between portion 15 and portion 14 on the right-hand side, has a particular curved shape, the convexity of which is directed towards the centre of the die. Similarly, the parting line 19, which is situated at the boundary between portion 15 and portion 14 on the left-hand side, has the same particular curved shape, with the convexity also being directed towards the centre of the die. The straight lines 16 and 17 represent the edges of re-entrant angles, which bear the same reference numerals as in FIG. 2A. The broken lines relate to the connection between the parting lines 18, 19 of the portions 15 and 14 of FIG. 2A and their traces 18, 19 which are visible on the surface of the die, as shown in FIG. 2B. By virtue of the curved shape of the parting lines between the central portion and the two outer portions, the magnetic flux per unit of length (the length of the piece 20 being taken in the horizontal direction in the Figure) in the ferrite of the piece 20 decreases progressively towards the ends. Although the above-described embodiment is preferred, it is obvious that the boundaries 18 and 19 of the mild steel portions may alternatively be differently shaped. For example, the direction of the convexities (18, 19, FIG. 2B) may be reversed.

Figure 3:
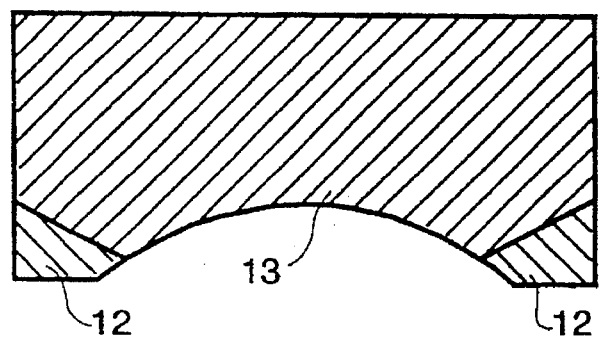
FIG. 3 schematically shows a first variant embodiment of a die.
Figure 4:
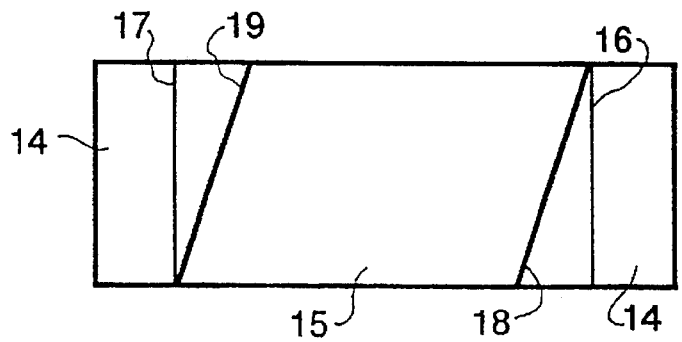
FIG. 4 schematically shows a second variant embodiment of a die.

It is alternatively possible to use one of the embodiments shown in FIGS. 3 and 4, i.e.:

FIG. 3 is a lateral sectional view, which is to be compared with that of FIG. 2A, in which the portions 12 have a wedge-shaped vertical section, with slanted separating surfaces between the portions 12 and 13, which slope outwards instead of being vertical as shown in FIG. 2A, FIG. 4 is a top view of an embodiment of a die which differs from that shown in FIG. 3, and which is to be compared with that shown in FIG. 2B, and in which the portions 14 have a wedge-shaped horizontal portion and the parting lines 18 and 19 between the portions 14 and 15 are straight lines which extend obliquely with respect to the die. Finally, the "copper" portions may alternatively be made of any other non-magnetic or paramagnetic material, for example brass, aluminum, synthetic resin. They could even consist simply of air, i.e. there would only exist the above-described mild steel portions 13 and 15: the portions referenced 12 or 14 in FIG. 2 would disappear and the die would be simpler. The reason why the metal end portions 12 or 14 are provided is that their presence enables the die to be interchanged with a die in accordance with the prior art, while said die can be secured to the magnetizing machine without any problem.

It is also obvious that it would be possible to use only one die comprising a magnetic element which leaves the end portions of the piece to be magnetized partly uncovered, since a single non-magnetic part in the path of the induction lines would be sufficient to modify their path and would enable the desired effect to be achieved.

I claim:

1. A method of manufacturing a ferrite magnet for motors, in which method a piece having the form of a segment of a cylinder is produced by pressing ferrite powder, under the influence of a magnetic field to orient the grains, in a mould in the form of a segment of a cylinder, whereafter the piece is sintered and finally permanently magnetized by placing the piece between two dies of a magnetizable material, the dies being the armatures of an electromagnet and the dies each contacting said piece along one of the cylindrical surfaces of the segment, wherein the length of the piece is defined as being taken along the arc of the circle which forms the cylinder segment, and at least one die only partly covers longitudinal end portions of the piece with magnetizable material, thereby applying to the piece a magnetic flux per unit length of the piece which decreases progressively towards the end portions to produce a resulting level of permanent magnetization of the piece that also decreases progressively toward the end portions.

2. A method of manufacturing a ferrite magnet as claimed in claim 1 wherein both of the dies only partly cover the longitudinal end portions of the piece with magnetizable material.

3. A method of manufacturing a ferrite magnet as claimed in claim 1, wherein said at least one die includes a central portion made of a magnetizable material, said central portion having end faces, and an outer portion adjacent to each said end face, said outer portion being made of a non-magnetizable material, and wherein the end faces are curved.

4. A method of manufacturing a ferrite magnet as claimed in claim 1, wherein said at least one die includes a central portion made of a magnetizable material, said central portion having end faces, and an outer portion adjacent to each said end face, said outer portion being made of a non-magnetizable material, and wherein the end faces are planar, extending slantwise with respect to the length of the piece.

5. A method of manufacturing a ferrite magnet as claimed in claim 1, wherein said at least one die comprises three portions having parting lines situated at the location of the contact surface between the die and the piece, only a central portion of said die being made from a magnetizable material.

6. A method of manufacturing a ferrite magnet as claimed in claim 1, wherein said at least one die includes two symmetrical outer portions that are made of non-magnetizable material.

7. A ferrite magnet in the form of a segment, which is manufactured as claimed in claim 1 characterized in that it comprises at least one end region whose magnetic flux in the ferrite decreases progressively towards the end.

* * * * *